(12) United States Patent
Nivala et al.

(10) Patent No.: US 9,842,150 B2
(45) Date of Patent: Dec. 12, 2017

(54) METHOD, AN APPARATUS, A COMPUTER SYSTEM AND A COMPUTER PROGRAM PRODUCT FOR DEFINING VISIBILITY OF OBJECTS IN METADATA-BASED FILE ARRANGEMENT IN MOBILE ENVIRONMENT

(71) Applicant: M-Files Oy, Tampere (FI)

(72) Inventors: Antti Nivala, Pirkkala (FI); Paivi Yli-Olli, Tampere (FI); Ari Laaja, Nokia (FI)

(73) Assignee: M-FILES OY, Tampere (FI)

( * ) Notice: Subject to any disclaimer, the term of this patent is extended or adjusted under 35 U.S.C. 154(b) by 396 days.

(21) Appl. No.: 14/639,217

(22) Filed: Mar. 5, 2015

(65) Prior Publication Data
US 2016/0259833 A1    Sep. 8, 2016

(51) Int. Cl.
G06F 17/00    (2006.01)
G06F 17/30    (2006.01)
G06Q 10/10    (2012.01)

(52) U.S. Cl.
CPC .. *G06F 17/30572* (2013.01); *G06F 17/30011* (2013.01); *G06Q 10/10* (2013.01)

(58) Field of Classification Search
CPC .... G06F 3/011; G06F 8/315; G06F 17/30268; G06F 17/30277; G06F 2203/04806
See application file for complete search history.

(56) References Cited

U.S. PATENT DOCUMENTS

2006/0156246 A1\* 7/2006 Williams .......... G06F 17/30265
715/764

\* cited by examiner

*Primary Examiner* — Truong Vo
(74) *Attorney, Agent, or Firm* — Ware, Fressola, Maguire & Barber LLP

(57) ABSTRACT

The invention relates to determining a visibility component from a metadata value of an object, determining a visibility-affecting feature of a mobile device using the information management system, and retrieving the object to a display view of the mobile device, if the determined visibility-affecting feature corresponds to a value of a visibility property of the visibility component. The invention further relates to an apparatus, and a computer program product that perform the method.

17 Claims, 10 Drawing Sheets

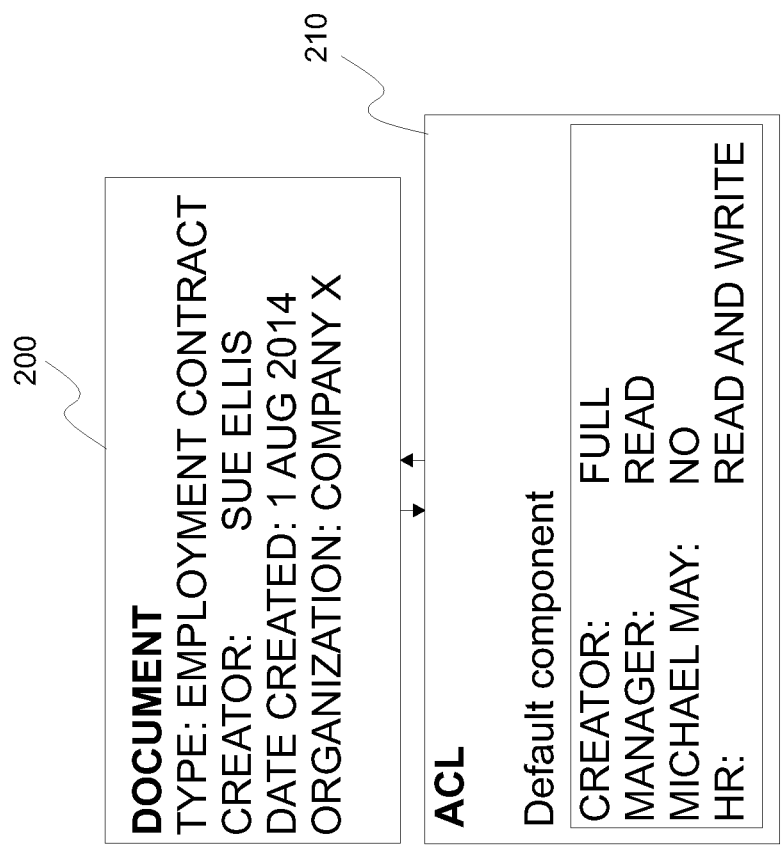

CONTACT PERSON

NAME: LISA SAM
ORGANIZATION: FIRM F

600

FIRM F

VISIBILITY: ENTERPRISE DEVICES

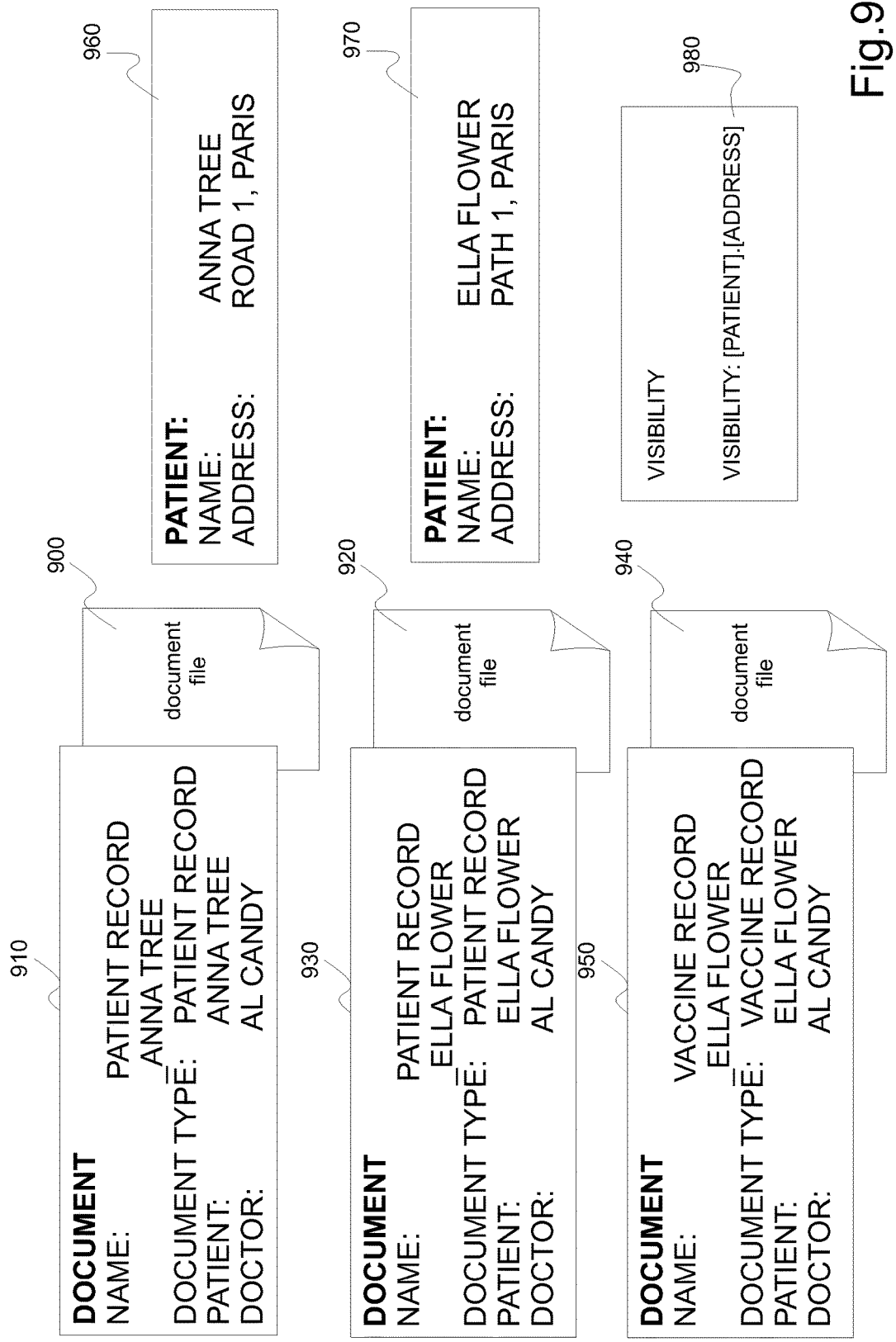

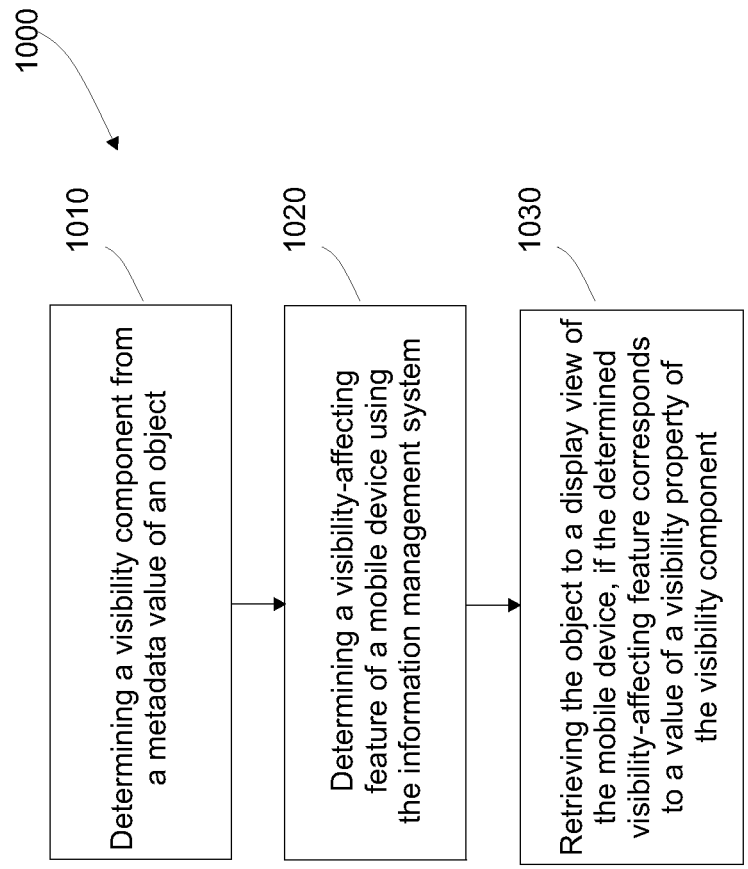

METHOD, AN APPARATUS, A COMPUTER SYSTEM AND A COMPUTER PROGRAM PRODUCT FOR DEFINING VISIBILITY OF OBJECTS IN METADATA-BASED FILE ARRANGEMENT IN MOBILE ENVIRONMENT

TECHNICAL FIELD

The present application relates to using of an information management system in mobile environment. In particular, the present application relates to metadata controlling visibility of the content of an information management system for a mobile device.

BACKGROUND OF THE INVENTION

Enterprise Information Management (EIM) system refers to a system organizing and storing organization's electronic content, such as documents and other business-related objects, and/or structural data. EIM system may comprise enterprise content management (ECM) systems, content management systems (CMS), document management systems (DMS) and data management systems. Such systems comprise various features for managing electronic content, e.g. storing, versioning, indexing, searching for and retrieval of documents or other electronic objects, and for defining structural data. It is appreciated that there are both dynamic and static information management systems. The difference between dynamic and static systems is the way they store files. In static systems, the files are stored e.g. in a constant treelike hierarchy that defines relationships for folders and documents stored in the tree. In dynamic systems, the files may be given identifications that define their existence in the system. The location of the files is not constant, but may vary in a virtual space depending on the situation.

SUMMARY OF THE INVENTION

Now there has been invented an improved method and technical equipment implementing the method. Various aspects of the invention include a method, an apparatus, and a computer readable medium comprising a computer program stored therein, which are characterized by what is stated in the independent claims. Various embodiments of the invention are disclosed in the dependent claims. These various embodiments therefore result in a new and a more efficient method, apparatus and computer program product.

According to a first aspect, there is provided a method for an enterprise information management system storing electronic data as electronic objects, wherein an electronic object is associated with metadata having one or more properties and corresponding values, the method comprising determining a visibility component from a metadata value of an object, determining a visibility-affecting feature of a mobile device using the information management system, and retrieving the object to a display view of the mobile device, if the determined visibility-affecting feature corresponds to a value of a visibility property of the visibility component.

According to an embodiment, the visibility-affecting feature is location. According to an embodiment, the location is defined by coordinates of global positioning system. According to an embodiment, the visibility-affecting feature is a type of a network via which the information management system is used. According to an embodiment, the visibility-affecting feature is a type of an application by which the mobile device uses the information management system. According to an embodiment, the visibility-affecting feature is an owner of the mobile device. According to an embodiment, the object comprises a document file. According to an embodiment, the metadata of the object refers directly to the visibility component. According to an embodiment, the metadata of the object refers indirectly via another object to the visibility component. According to an embodiment, the visibility component is a visibility object arranged to define visibility of one or more objects. According to an embodiment, the method further comprises retrieving the object to a display view of a non-mobile device.

According to a second aspect, there is provided an apparatus comprising at least one processor, memory including computer program code, the memory and the computer program code configured to, with the at least one processor, cause the apparatus to perform at least the following determine a visibility component from a metadata value of an object, determine a visibility-affecting feature of a mobile device using the information management system and retrieve the object to a display view of the mobile device, if the determined visibility-affecting feature corresponds to a value of a visibility property of the visibility component.

According to an embodiment, the visibility-affecting feature is location. According to an embodiment, the location is defined by coordinates of global positioning system. According to an embodiment, the visibility-affecting feature is a type of a network via which the information management system is used. According to an embodiment, the visibility-affecting feature is a type of an application by which the mobile device uses the information management system. According to an embodiment, the visibility-affecting feature is an owner of the mobile device. According to an embodiment, the object comprises a document file. According to an embodiment, the metadata of the object refers directly to the visibility component. According to an embodiment, the metadata of the object refers indirectly via another object to the visibility component. According to an embodiment, the visibility component is a visibility object arranged to define visibility of one or more objects. According to an embodiment, the apparatus is further caused to retrieve the object to a display view of a non-mobile device.

According to a third aspect, there is provided a computer program product embodied on a non-transitory computer readable medium, comprising computer program code configured to, when executed on at least one processor, cause an apparatus to determine a visibility component from a metadata value of an object, determine a visibility-affecting feature of a mobile device using the information management system, and retrieve the object to a display view of the mobile device, if the determined visibility-affecting feature corresponds to a value of a visibility property of the visibility component.

According to an embodiment, the visibility-affecting feature is location. According to an embodiment, the location is defined by coordinates of global positioning system. According to an embodiment, the visibility-affecting feature is a type of a network via which the information management system is used. According to an embodiment, the visibility-affecting feature is a type of an application by which the mobile device uses the information management system. According to an embodiment, the visibility-affecting feature is an owner of the mobile device. According to an embodiment, the object comprises a document file. According to an embodiment, the metadata of the object refers directly to the visibility component. According to an embodiment, the metadata of the object refers indirectly via another object to the visibility component. According to an embodiment, the visibility component is a visibility object arranged to define visibility of one or more objects. According to an embodiment, the apparatus is further caused to retrieve the object to a display view of a non-mobile device.

According to a fourth aspect, there is provided an apparatus comprising means for determine a visibility component from a metadata value of an object, means for determine a visibility-affecting feature of a mobile device using the information management system; and means for retrieve the object to a display view of the mobile device, if the determined visibility-affecting feature corresponds to a value of a visibility property of the visibility component.

DESCRIPTION OF THE DRAWINGS

In the following, various embodiments of the invention will be described in more detail with reference to the appended drawings, in which

FIG. 2 shows examples of objects and access rights controlling system in an information management system;

FIG. 6 shows objects in an information management system according to an embodiment;

FIG. 9 shows objects in an information management system according to an embodiment; and FIG. 10 shows a flowchart of a method according to an embodiment.

DESCRIPTION OF EXAMPLE EMBODIMENTS

In the following, several embodiments of the invention will be described in the context of using enterprise information management system in mobile environment. It is to be noted, however, that the invention is not limited to this. In fact, the different embodiments have applications in any environment where secure access to an information management system is required.

Information management system (also known as data management system or content management system), such as enterprise content management systems (ECM), for example, a quality management system (QMS), a document management system (DMS), a customer relationship management system (CRM), can store data (i.e. electronic objects) either statically or dynamically. The present embodiments are disclosed with reference to a dynamic system. It is, however, appreciated that the teachings of the present solution can also be applied to static systems.

In dynamic content management systems, electronic objects do not have a static location in a certain static folder. In dynamic content management systems, folders are so called virtual folders, which are created dynamically based on certain metadata properties. Term "metadata" refers to a set of properties, which set of properties comprises one or more properties having values. A property may have one or more values. An object in a dynamic content management system is a representation of any data. The object may have relationship with (i.e. refers to/is referred by) other objects. The dynamic data management system has a metadata structure that defines semantics for the data. The metadata structure defines metadata for different objects as well as relationships between objects. An ECM system according to embodiments of the invention may comprise at least one server for storing electronic objects, wherein the server may be a so-called on-premises server or a cloud server or their combination.

Figure 1B:
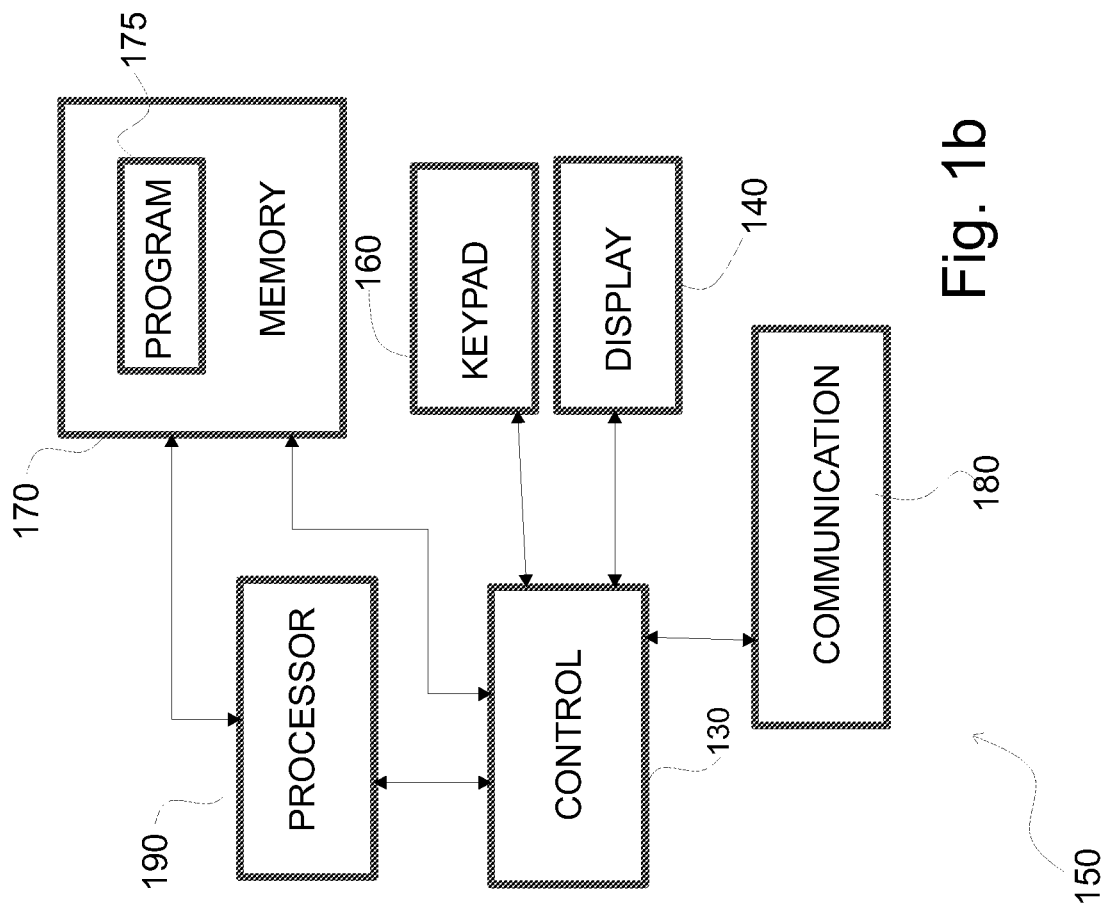
FIG. 1b shows an apparatus according to an embodiment.
Figure 1A:
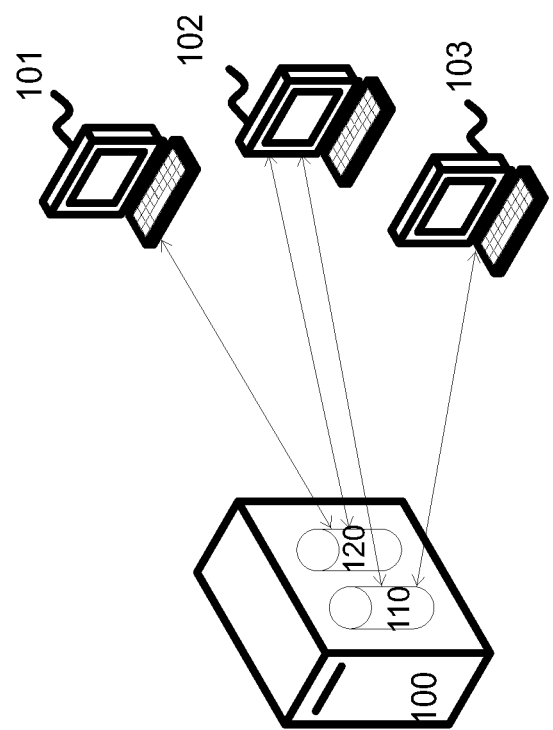
FIG. 1a shows an information management system according to an embodiment.

FIG. 1a illustrates an enterprise information management system according to an embodiment. The system comprises at least one server 100 for storing electronic objects. The server may be a so called on-premises server or a cloud server or their combination. The electronic objects may be stored in one or more data vaults 110, 120. One or more client devices 101, 102, 103 can access said at least one server 100 in order to work with the stored electronic objects. For example, a client device may check out an object, wherein a user of the client device may modify the checked-out object. After modification, the user of the client device checks the object in the vault again, wherein the object will be available to other users. The client device may be a personal computer, a mobile device, a laptop, a tablet device, or any computer device. The content stored in the server is used through an application, wherein the application may be universal for all types of client devices, or there can be a client device specific content management application for each device, e.g. a mobile application, a web-based application, a desktop application. In addition, the server device 100 may have its own server application.

An apparatus according to an embodiment is illustrated in FIG. 1b in simplified manner. The apparatus 150 may represent a server device 100 or client device 101, 102, 103 of FIG. 1a. The apparatus 150 comprises processing means, such as a processor 190 for processing data. The apparatus 150 further comprises memory means, such as a memory 170, storing computer program code 175, applications and various electronic data. The apparatus 150 comprises controlling means, such as a control unit 130, for controlling functions in the apparatus 150. The control unit 130 may run a user interface software to facilitate user control of at least some functions of the apparatus 150. The control unit 130 may also deliver a display command and a switch command to a display 140 to display visual information, e.g. a user interface. The control unit 130 may communicate with the processor 190 and can access the memory 170. Further, the apparatus 150 may comprise input means e.g. in a form of a keypad 160. Yet further, the apparatus 150 comprises various data transfer means, such as a communication block 180 having a transmitter and a receiver for connecting to a network and for sending and receiving information. The communication means can be adapted for telecommunications and/or wide-range and/or short range communication.

Today's Enterprise Information Management (ICM) systems may control user's rights to access content, for example, by access control lists (ACL). The term "content" may in this context refer to any object stored in the information management system, for example, electronic documents and other business-related objects, contents in object's electronic metadata, entire classes of documents and data objects and/or even different versions of the same document or object. An ACL defines and allocates access rights of the content in question for users, for example, individual users, user groups or pseudo-users i.e. users being defined by object-specific metadata. Metadata properties of the content in question may be referred by the ACL defining and allocating access rights. This means that an ACL may allocate for certain user(s) determined access rights to content. Allocated access rights may be, for example, read access right and/or write access right (change, add and/or delete). Allocated access rights may have be allocated on the basis of metadata properties of the content in question. Metadata properties may relate, for example, to users. It is also possible that there is some other metadata property, for example, a certain access right metadata property defining access rights for users. The ACL may be associated with the object by other means than referring, e.g. by inclusion, by linking, by direct reference or by indirect reference, etc.

FIG. 2 illustrates an example of an object with metadata properties and an ACL defining and allocating access rights on the basis of metadata relating to users. An example of an object is a document 200, having metadata properties for a type; a creator; a date created; an organization.

The data management system can control access to object's 200 content on the basis of who is allowed to access the object and who is not. This can be implemented by defining an ACL for an object, for example as shown in FIG. 2. There is illustrated that the object 200 refers to an ACL 210 that comprises a component allocating full access (read and write access) to the creator ("SUE ELLIS") of the document object 200, read access to persons in "manager" role and read-write access to persons in "HR" group.

In previous, the access to objects may be controlled by name-based or role-based access control lists (ACL) that define whether a certain person can have access to a certain object or not. In any case, the object can be accessed by the user according to the defined access rights.

Instead of the traditional approach of controlling access rights, the embodiments of the invention control visibility of objects on a display view on the basis of metadata properties in mobile environment, wherein the mobile environment may consist of mobile devices using wireless communication. In the approach of the present invention, a visibility-affecting feature of a mobile device using an information management system is determined and this visibility-affecting feature is compared to a metadata value of a visibility component of an object. If the visibility-affecting feature corresponds with the metadata value, either directly or according to a logical rule of the system, the object may be retrieved and displayed on a display view of the device. Otherwise the object is not displayed. A visibility-affecting feature may be, for example, location of a device, type of a network via which the ECM system is used, type of an application by which the ECM system is used or ownership (private or non-private device) of a device using the ECM system. Non-private i.e. business devices may have been determined for the system. When a non-mobile device, for example, a personal computer, and native application are used, objects may be retrieved and displayed—unless limited in other way—regardless of a visibility property or a visibility-affecting feature. The mobile device may, however, use an information management system outside corporate network utilizing a secure connection. A known solution is to provide VPN (Virtual Private Network) functionality to a mobile device, said VPN functionality enabling a secure, tunneled connection of a mobile device to corporate network. The VPN solution may optionally use additional security factors such as requiring a client certificate or a pre-shared key on a client device or requiring multi-factor authentication when opening the VPN connection. When using VPN functionality a mobile device may be considered as a non-mobile device and objects may be retrieved and displayed regardless of a visibility property or a visibility-affecting feature relating to mobile devices. A mobile device utilizing a secure connection may be an example of a more trusted device.

It may also be possible to control visibility of objects on a display view on the basis of metadata properties in non-mobile environment, wherein the non-mobile environment may consist, for example, of PC devices or laptops. Also in this approach, a visibility-affecting feature of a non-mobile device using an information management system is determined and compared to a metadata value of a visibility component of an object. If the visibility-affecting feature corresponds with the metadata value, either directly or according to a logical rule of the system, the object may be retrieved and displayed on a display view of the non-mobile device. Otherwise the object is not displayed.

When visibility of objects is controlled, objects that are arranged not to be displayed by, for example, a certain type of application or network or outside a certain location may be invisible for mobile devices in the information management system. Whereas, objects that are arranged to be displayed by, for example, a certain type of application or network or within a certain location, may be visible for mobile devices in the information management system. However, it should be noted that there may be an ACL that defines whether a user can have access to a certain object or not. In other words, an object may be defined to be visible, but an ACL defined for the object may reject utilization of the object i.e. user may not have access rights to the visible object.

Figure 3:
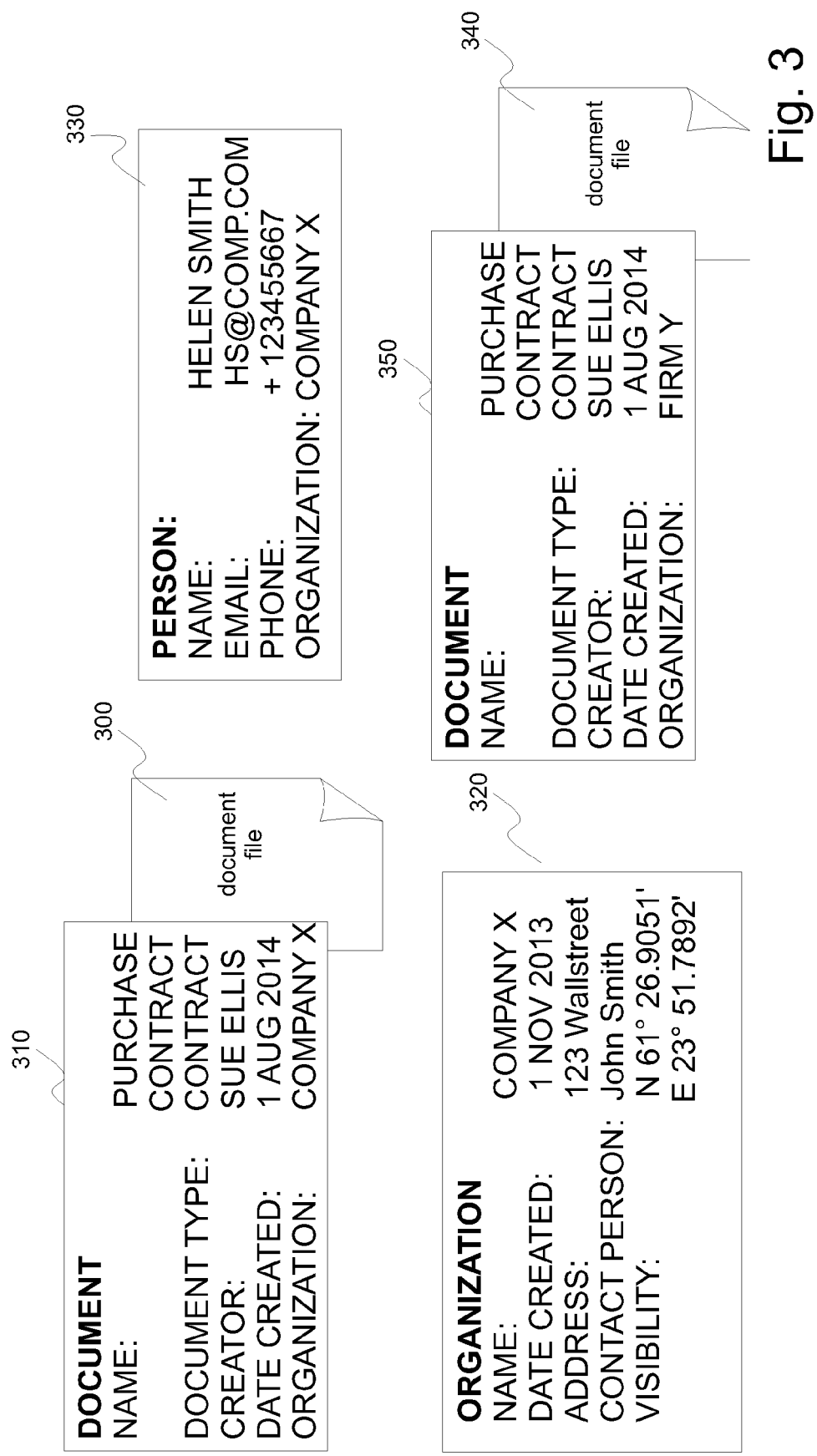
FIG. 3 shows objects in an information management system according to an embodiment.

FIG. 3 illustrates examples of objects with metadata properties controlling visibility of objects by means of metadata values according to an embodiment of the invention. FIG. 3 shows a document object 300, which may be, for example, a text file (created e.g. by Microsoft Word, OpenOffice), a spreadsheet (created e.g. by Microsoft Excel), an image file (e.g. JPEG, TIFF, PCT etc.), etc. The document object 300 is, in this example, associated with metadata 310 having metadata properties "Name; Document Type; Creator; Date created; Organization" having corresponding values "Purchase Contract; Sue Ellis; 1 Aug. 2014; Company X". Further, it is illustrated a person object 330 having metadata properties "Name; Email; Creator; Phone; Organization" with corresponding values "Helen Smith; hs@comp.com; +123455667; Company X" and document object 340 having metadata properties 350 "Name; Document Type; Creator; Date created; Organization" with corresponding values "Purchase Contract; Contract; Sue Ellis; 1 Aug. 2014; FIRM Y".

The metadata 310 of document file 300 and the person object 330 refer to an organization object 320 having metadata properties for "Name: Company X"; "Date created: 1 Nov. 2013"; "Address: 123 Wallstreet"; "Contact Person: John Smith"; "Visibility: N 61 °26.9051' 23 °51.7892'". The metadata property "Visibility" has GPS coordinates as a metadata value. These GPS coordinates may correspond, for example, to the address of "Company X". This means that an object comprising visibility property in metadata or any object referring to that object comprising visibility property in metadata may be visible i.e. displayed on a display view of a mobile device, when the mobile device is located in the defined location of visibility property or near the defined location of visibility property. The term "near" may in this context refer to a distance that is close enough the defined location. The distance may have been predetermined for the system, for example, by meters or by some other way. The distance may also be determined to be zero. The distance may also be part of the value of the metadata property "Visibility", such as in "Visibility: WITHIN 2 MILES FROM N 61 °26.9051' 23 °51.7892'".

Location-based visibility can be specified by any means by which a location can be defined, for example, as a textual address or other address information or by means of GPS coordinates or coordinates of another coordinate system or positioning system, or as an area specification, e.g., by one or more polygons consisting of coordinate pairs or the name of a known area such as a city or country name, or similar.

In practice this means that a view configured to display the objects may retrieve objects comprising visibility property in metadata and/or any object referring to that object comprising visibility property in metadata to the display of a mobile device when the mobile device is in (or close enough) the location defined by the value of the visibility property. In other words, the ECM system is configured so that objects or objects referring to an object having visibility property are controlled so that they are visible for the mobile device only when the mobile device is in (or close enough) that predetermined location (or non-visible in that predetermined location if a metadata property is "Non-visibility"). Therefore, the organization object 320 and/or objects 300, 330 referring to the organization object 320 may be visible in a view comprising displaying of objects that may be generated to the display when the mobile device is in N 61 °26.9051' 23 °51.7892' or close enough i.e. inside a certain tolerance around these coordinates defined for the EIM system. Otherwise, those objects are not displayed in that display of the mobile device i.e. they are invisible. However, when using a non-mobile device, for example, a personal computer or other more trusted device and native application the objects 320, 300 and/or 330 may be retrieved and displayed regardless of the visibility property.

However, objects not having visibility property definition in metadata or objects directly or indirectly referring to an object not having visibility property definition may not be displayed at all by a mobile device. For example, in this embodiment the object 340 refers to an organization object (not shown) having metadata properties only for "Name: Firm Y", not having metadata property for visibility. Therefore object 340 may not be shown in any location when a mobile device is used. However, when using a non-mobile device, for example, a personal computer or other more trusted device and native application the object 340 may be retrieved and displayed in any location. Location in this embodiment is a visibility-affecting feature. Alternatively, the EIM system may be configured to allow the retrieval and displaying of any objects that do not have a visibility property on all client types, including mobile devices. In other words, in such a configuration objects are visible by default for all client devices, but objects that have a visibility property in their metadata and objects directly or indirectly referring to an object that have a visibility property in its metadata can only be retrieved and displayed by a mobile device if the visibility-affecting feature of the mobile device corresponds the visibility property.

Objects defined to be visible may be displayed, for example, on a display view of a mobile device, for example, in a virtual directory relating to one or more metadata properties of objects, or by some other way when a visibility-affecting feature matches with the metadata value in question.

Visibility definition of objects relating to the location matters especially when the EIM system is used by a mobile device. The mobile device may be, for example, a mobile phone, a mobile computer, a mobile collaboration device, a mobile internet device, a smartphone, a tablet computer, a tablet personal computer (PC), a personal digital assistant or any other suitable mobile device. However, it is also possible that the device is any other device suitable for displaying content/objects on its display(s).

Figure 4:
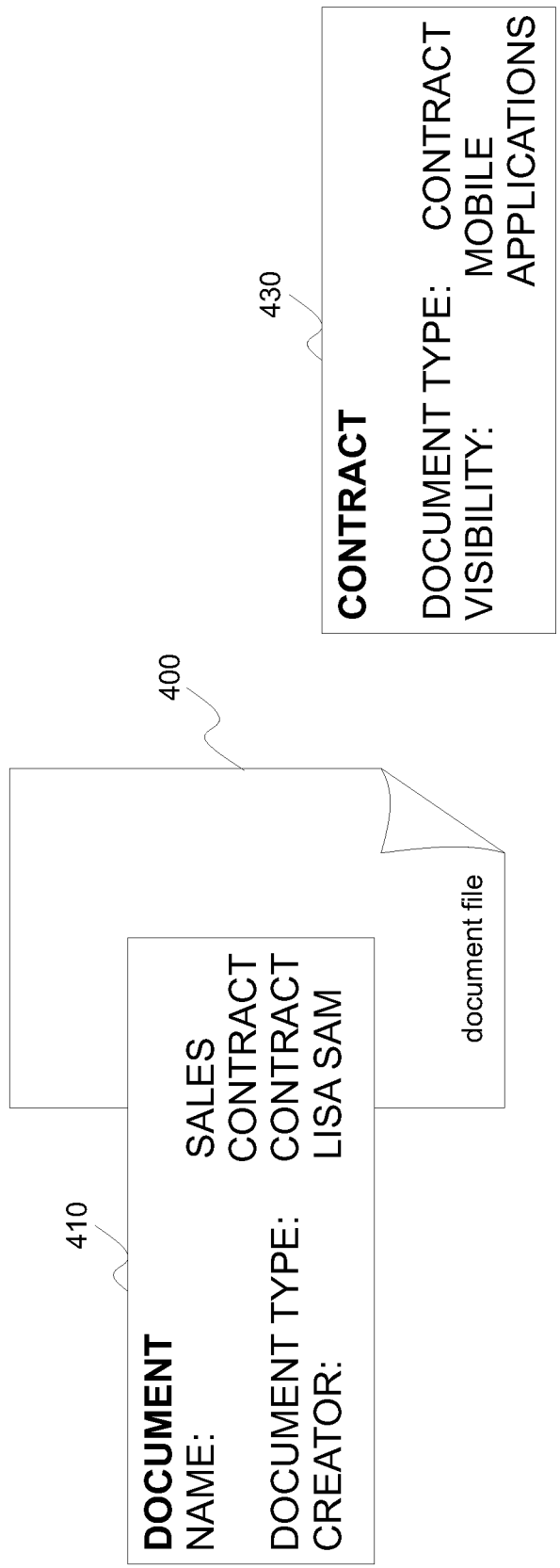
FIG. 4 shows objects in an information management system according to an embodiment.

The visibility of objects may also be rejected or enabled on the basis of a type of application using the EIM system. Application type is another example of a visibility-affecting feature. Possible application types are, for example, a mobile application (e.g. a native iOS, Android or Windows Phone application), a web-based application accessed via a web browser, a native desktop application (e.g. a Microsoft Windows desktop application, a Linux desktop application or a Mac OS desktop application), and a containerized application (e.g. a mobile application wrapped by the organization's mobile device management (MDM) solution). The EIM system may be arranged to determine the type of an application of a device using the EIM system. The EIM system may, for example, determine the type of an application of a mobile device using the information management system. Alternatively the device, for example, a mobile device using the information management system is arranged to notify the server about the type of application it uses. The EIM system may require various levels of proof from the client application when determining the type of application. For example, all applications may be assumed to be of the least trusted type by default (e.g. mobile applications) unless a client application presents evidence such as a key value or credentials that prove to the server of the EIM system that the application is of another more trusted application type, for example, a web-based application. FIG. 4 illustrates examples of objects with metadata properties controlling visibility of objects by means of metadata values according to an embodiment of the invention. FIG. 4 shows a document object 400, which may be, for example, a text file. The document object 400 is, in this example, associated with metadata 410 having metadata properties "Name; Document Type; Creator" having corresponding values "Sales Contract; Contract; Lisa Sam". Further, there is illustrated a contract object 430 having metadata properties "Document type; Visibility" having corresponding values "Contract; Mobile applications". Application type is a visibility-affecting feature in this embodiment.

The metadata 410 of the document file 400 refers to the contract object 430 having a metadata property visibility with value "Mobile applications". This means that the contract object 430 having visibility property definition in metadata or any object referring (via/through/by the document file's 400 metadata 410 in this embodiment) to that object 430 may be visible i.e. it may be retrieved to be displayed on a display of a mobile device when a mobile device uses the information management system by a mobile application. The EIM system is in this embodiment configured so that object(s) having visibility property definition or objects referring to an object having visibility property definition via one or more metadata values are controlled so that they are visible on the display of the mobile device when the device uses the content through a mobile application only if the value of the visibility property includes "Mobile applications". When a non-mobile device uses the content through a native or a web application, those objects may be shown in the view of the non-mobile display i.e. they are visible. Alternatively, the EIM system may be configured in such a way that the objects are not visible through a native or a web application in such case. In which case the value of the visibility property may be a non-visibility property and its value may include "Native applications" or "Web applications".

Further, the visibility of objects may also be rejected or enabled on the basis of a type of used network. Network type is again an example of a visibility-affecting feature. Possible network types may be, for example, an enterprise network and non-enterprise network. These examples of network are named mainly to describe the network type, private or public. The EIM system may determine the type of network used by a device arranged to use the EIM system.

Figure 5:
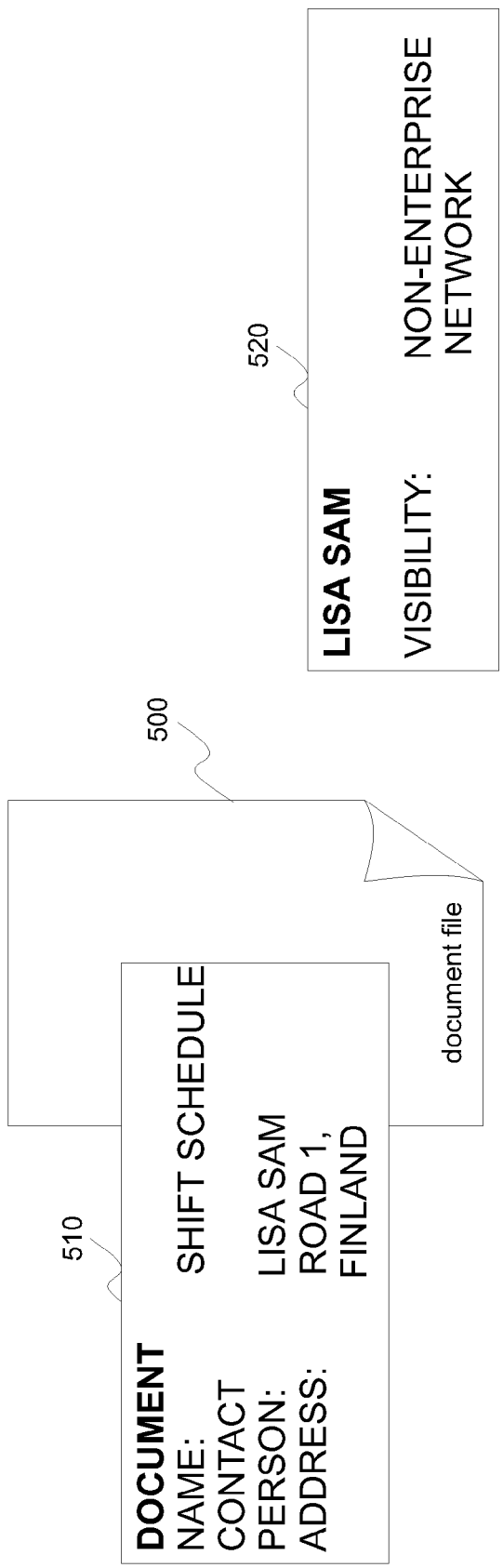
FIG. 5 shows objects in an information management system according to an embodiment.

FIG. 5 illustrates another example of objects with metadata properties controlling visibility of objects by means of metadata values according to an embodiment of the invention. FIG. 5 shows a document object 500 which may be, for example, a text file. The document object 500 is, in this example, associated with metadata 510 comprising metadata properties "Name; Contact Person; Address" having corresponding values "Shift schedule; Lisa Sam; Road 1, Finland". Further, there is illustrated a person object 520 "Lisa Sam" having "Non-enterprise network" value for a visibility metadata property. It is realized that the metadata 510 of the document file 500 refers to the person object 520 "Lisa Sam" by the corresponding metadata value "Lisa Sam". Visibility property of the person object 520 "Lisa Sam" and its value define that any object referring to the person object 520 "Lisa Sam" and the person object 520 "Lisa Sam" itself are visible by mobile devices using the EIM system outside the enterprise network. Other objects that do not include the value "Non-enterprise network" in their visibility property are not visible for mobile devices outside the enterprise network in this embodiment.

Alternatively, visibility of objects may also be rejected or enabled on the basis of mobile device ownership. Ownership of a mobile device is again a further example of a visibility-affecting feature. The device may be, for example, a mobile device that is registered or otherwise indicated to be enterprise device, i.e. non-private mobile device. There may, for example, be a register in a server comprising devices of employees of the enterprise, wherefrom it is possible to determine if the device using the EIM is enterprise device or not. If the mobile device is not registered or otherwise marked to be enterprise property, it may simply be handled as a non-enterprise mobile device, i.e. private mobile device. The EIM system may determine the ownership of a mobile device arranged to use the EIM system or the mobile device may notify the system about its ownership. The system may require specific proof from the mobile device as part of such notification. Again this is just an example.

FIG. 6 further illustrates another example of objects with metadata properties controlling displaying of objects by means of metadata values according to an embodiment of the invention. FIG. 6 shows a contact person object 600 comprising metadata properties "Name; Organization" having corresponding values "Lisa Sam; Firm F". Further, there is illustrated an organization object 610 "Firm F" having visibility metadata property, the value of which is "Enterprise devices". It is realized that the contact person object 600 refers to the organization object 610 "Firm F" defining that any object referring to the organization object 610 "Firm F" and the organization object 610 itself are visible on a view of a display of enterprise mobile (non-private) devices only. Objects referring to the organization object 610 "Firm F" from the corresponding metadata value "Firm F" and the organization object 610 itself are invisible for private mobile devices. This means that those objects are not displayed on a display, for example, in the virtual directory, by a private mobile device that is not a mobile device of a company that owns or controls the information management system/the server from where the objects are retrieved. The EIM system may comprise information, for example, a register, about devices that are so-called enterprise devices, or the mobile devices may notify the system of their ownership status (enterprise/private) when connecting to the EIM system. The system may require specific proof from the mobile device as part of such notification. Ownership is a visibility-affecting feature in this embodiment. Also, in this embodiment, objects referring to the organization object 610 "Firm F" from the corresponding metadata value "Firm F" and the organization object 610 itself may be visible for a non-mobile device using native application.

It should be noted that the above shown metadata properties and values of objects are just simplified examples of possible properties and values suitable to be used for enabling/rejecting visibility of objects. References between objects can also be arranged as needed/desired, because they are not limited either. In addition, a number of metadata properties and/or values and/or references between objects are not restricted to shown embodiments; on the contrary they are freely selectable for being suitable to a purpose.

An object defining mobile device visibility of other object(s) or content(s) referring to it directly or indirectly may be called a visibility component, even if it also has other purposes than defining visibility. For example, objects 430, 520, and 610 are examples of visibility components. In addition, visibility may be defined by a dedicated visibility object. These dedicated visibility objects are also examples of visibility components. Example of visibility objects are shown in FIGS. 7 and 8.

Figure 7:
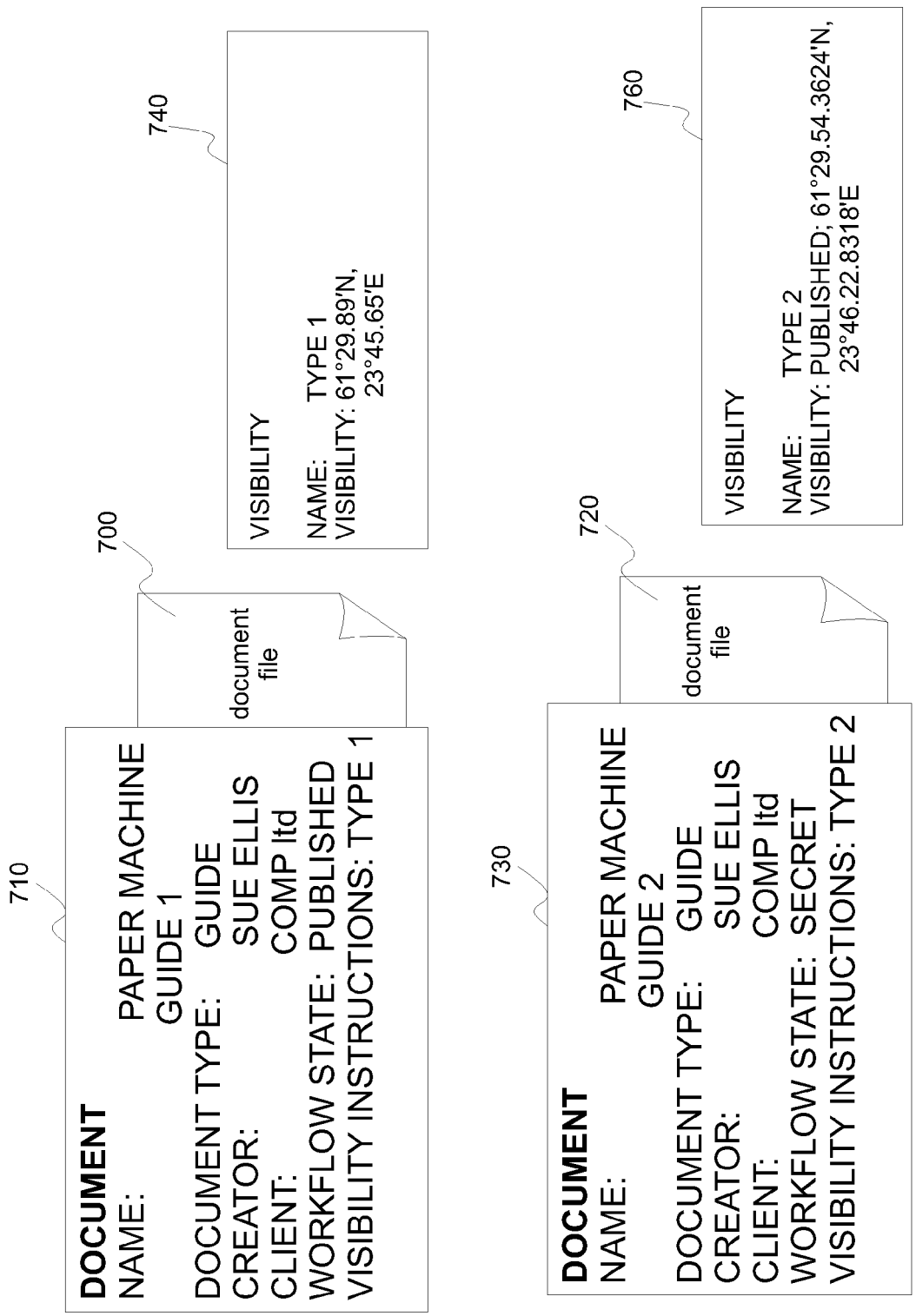
FIG. 7 shows objects in an information management system according to an embodiment.
Figure 8:
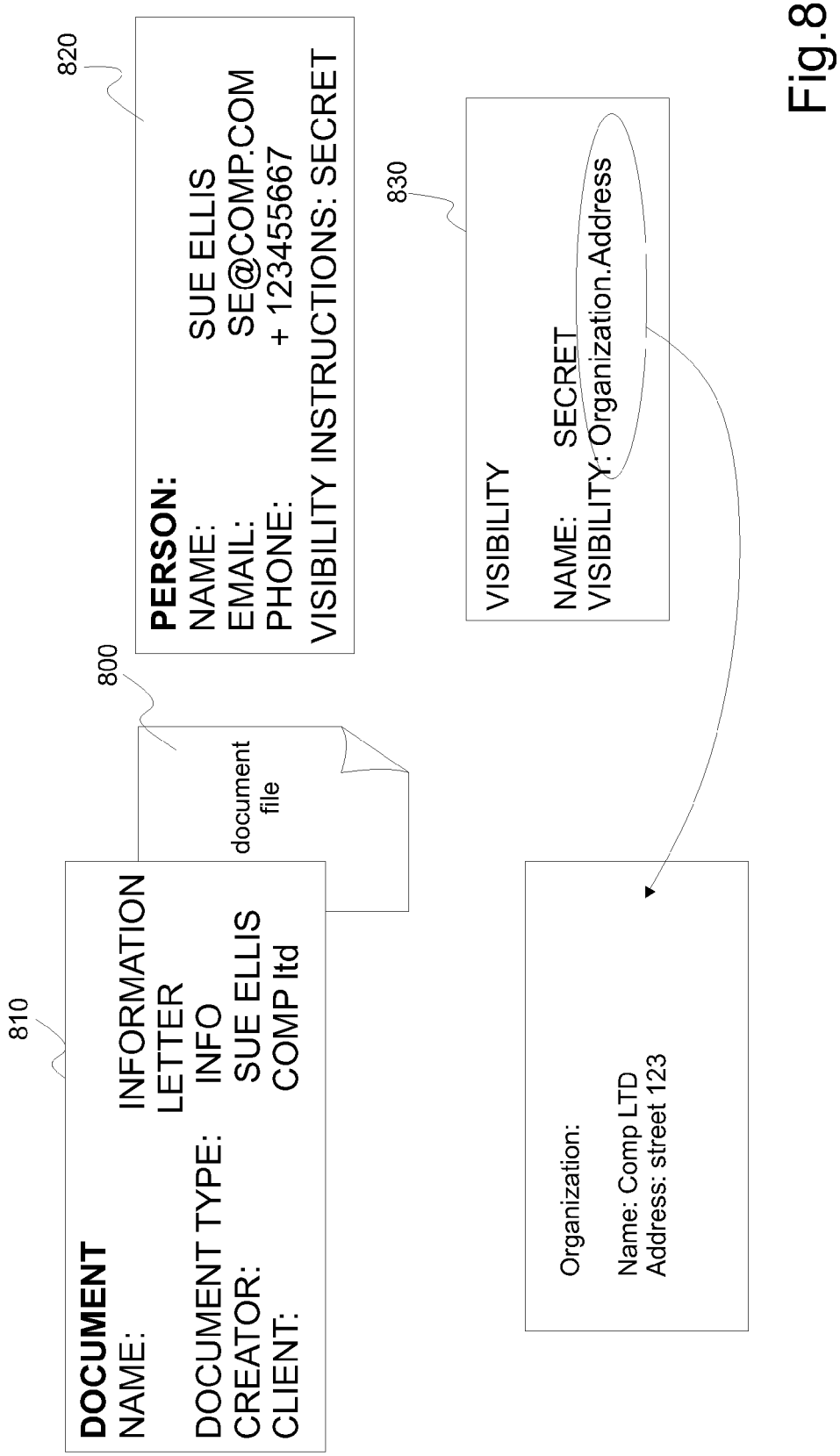
FIG. 8 shows objects in an information management system according to an embodiment.

FIG. 7 illustrates document objects 700, 720 which are, in this example, paper machine's guides (e.g. text files by Microsoft Word). Document objects 700, 720 are, in this example, associated correspondingly with metadata 710, 730 comprising metadata properties. The metadata 710 of the document file 700 has following metadata properties "Name; Document Type; Creator; Client; Workflow State; Visibility Instructions" having corresponding values "Paper Machine Guide 1; Guide; Sue Ellis; Comp ltd; Published; Type 1". The metadata 730 of the document file 720 has metadata properties "Name; Document Type; Creator; Client; Workflow State; Visibility Instructions" having corresponding values "Paper Machine Guide 2; Guide; Sue Ellis; Comp ltd; Secret; Type 2". The value "Secret" is selectable from a look-up menu comprising values "Secret" and "Published".

This embodiment of FIG. 7 relates again to visibility of objects, and defining visibility definition for object(s). According to yet a further embodiment, the system comprises separate visibility objects that are configured to enable and/or reject visibility of objects referring to it. The associated visibility object for the document file 700, the visibility object 740 "Type 1", is defined in the property "Visibility Instructions" of metadata 710 having a value "Type 1". The value "Type 1" is a direct reference to the visibility object 740. Whereas, the associated visibility object for the document file 720, the visibility object 760 "Type 2", is defined in the property "Visibility Instructions" of metadata 730 having a value "Type 2". The value "Type 2" is a direct reference to the visibility object 760. It should be noted that if the value for "Visibility Instructions" of metadata 710 is changed from "Type 1" to "Type 2", the reference would be changed accordingly to the visibility object 760 having a name "Type 2".

The visibility object 740 is associated with metadata comprising properties "Name" and "Visibility" having corresponding values "Type 1" and "61 °29.89'N, 23 °45.65'E". The value of the "Visibility" property means that the object 700 referring to the visibility object 740 is visible if a mobile device using the information management system is in that determined location or close enough. In this embodiment, the document file 700 is visible, i.e. retrievable and displayable, by a mobile device when the mobile device is in the 61 °29.89'N, 23 °45.65'E location or close enough to this location. Again the document file 700 may be visible in any location when a non-mobile device is used.

The visibility object 760 is associated with metadata having properties "Name" and "Visibility" having corresponding values "Type 2" and "Published; 61 °29.54.3624'N, 23 °46.22.8318'E". The value of the "Visibility" property means that object 720 referring to the visibility object 760 is visible for device(s) if the workflow state value of the object is "Published" and if a mobile device using the information management system is in that determined location or close enough. In this embodiment, the document file 720 is visible, i.e. retrievable and displayable, by a mobile device when the device is in the 61 °29.54.3624'N, 23 °46.22.8318'E location or close enough to this location and the document file 720 is in published state in its workflow. Locations in this embodiment are visibility-affecting features. Again the document file 720 may be visible in any location and in any workflow state when a non-mobile device is used.

The location coordinates of visibility object 740 may be, for example, coordinates of a paper machine indicating location of a first paper machine by GPS coordinates. Visibility object 740 therefore determines that documents or objects relating to that first paper machine are visible on a mobile device when the mobile device is at the location of the first paper machine or close enough i.e. near. Correspondingly, location coordinates of visibility object 760 may be, for example, coordinates of a second paper machine, indicated by GPS coordinates. Visibility object 760 therefore determines that only published documents or other published objects relating to that second paper machine are visible for mobile devices when a mobile device is at the location of the second paper machine or close enough. In this embodiment, the value for a metadata property "Workflow state" for a document file 720 is "Secret". Therefore, the document file 720 is not retrieved and displayed even if a mobile device is at the determined location of the second paper machine. It should be noted that instead of GPS coordinates it may be possible to use any other means for determining location/method of determining location where objects are visible or non-visible, for example, indoor positioning system.

Location information may also be used, for example, for displaying all documents and/or objects of a certain client or referring to the certain client on a mobile device, when the mobile device is in the location determined by the visibility property or visibility object. The determined location may be, for example, that client's office, factory etc. In addition, the location information may be used, for example, for hiding all documents and/or objects of a client when a mobile device is outside that determined location. It is again possible to determine a tolerance area around visibility location (near/close enough). The size of this tolerance area may have been configured for the EIM system. Due to this tolerance area, the mobile device may not have to be exactly at the determined location. It may be enough, if it is, for example, 5-100 m from determined location. The distance may depend on used configurations. All documents and/or objects of the client may again be visible in any location when a non-mobile device is used.

FIG. 8 illustrates a document object 800 which is, in this example, an information letter (e.g. a text file created by Microsoft Word). The document object 800 is associated with metadata 810 comprising metadata properties. The metadata 810 of the document file 800 has the following metadata properties "Name; Document Type; Creator; Client" having corresponding values "Information letter; Info; Sue Ellis; Comp ltd".

The document file 800 refers to a person object 820 via metadata property "Creator" which value is Sue Ellis. This is a direct reference to the object 820. The person object 820 refers to a visibility object 830 via metadata property "Visibility Instructions" of metadata 820 having a value "Secret". The value "Secret" is a direct reference to the visibility object 830. Therefore, the document file 800 refers indirectly to the visibility object 830 via metadata properties "Creator" and "Visibility Instructions" and via the object 820. In other words there is an indirect reference from the document file 800 to the visibility object 830.

The visibility object 830 is associated with metadata comprising properties "Name" and "Visibility" having corresponding values "Secret" and "Organization.Address". Value of "Visibility" property means that objects 800 and 820 referring to the visibility object 830 are visible on a display view of a mobile device, if the mobile device using the information management system is determined to be at COMP ltd.'s address or close enough. The area or address of COMP ltd is, in this example, predetermined for the system in the form of a textual address. Location is a visibility-affecting feature in this embodiment.

FIG. 9 illustrates document objects 900, 920, 940 which are, in this example, patient records or vaccine record (e.g. text files created by Microsoft Word). Document objects 900, 920, 940 are, in this example, associated correspondingly with metadata 910, 930, 950 comprising metadata properties. The metadata 910 of the document file 900 has following metadata properties "Name; Document Type; Patient; Doctor" having corresponding values "Patient record_Anna Tree; Patient record; Anna Tree; Al Candy". The metadata 930 of the document file 920 has metadata properties "Name; Document Type; Patient; Doctor" having corresponding values "Patient record_Ella Flower; Patient record; Ella Flower; Al Candy". The metadata 950 of the document file 940 has metadata properties "Name; Document Type; Patient; Doctor" having corresponding values "Vaccine record_Ella Flower; Vaccine record; Ella Flower; Al Candy".

The document file 900 refers to a patient object 950 via metadata property "Patient" which value is Anna Tree. This is a direct reference to the object 950. The document files 920, 940 refer to a patient object 960 via metadata property "Patient" which value is Ella Flower. These are direct references to the object 950.

This embodiment of FIG. 9 relates again to visibility of objects, and defining visibility definition for object(s). According to yet a further embodiment, the system comprises a visibility object 980 that is configured to enable and/or reject visibility of objects referring to it.

The visibility object 980 is associated with metadata comprising property "Visibility" having corresponding value "[PATIENT].[ADDRESS]". The value of the "Visibility" property means that object 900 is visible if a device, for example, a mobile device using the information management system is in that determined address Road 1, Paris and objects 920, 940 are visible if a device, for example, a mobile device using the information management system is in that determined address Path 1, Paris. Again the document files 900 and 920 may be arranged visible in any location if a non-mobile device is used instead of a mobile device.

Visibility object 980 therefore determines that documents or objects relating to patient Anna Tree are visible when the device is at the address of Anna Tree or close enough, and documents or objects relating to patient Ella Flower are visible on a device when the device is at the address of Ella Flower or close enough. It should be noted that instead of Address information it may be possible to use any other means for determining location/method of determining location where objects are visible or non-visible, for example, indoor positioning system if a patient's location relates to their location in a hospital. By this way it can be further ensured that only the patient's own patient record(s) are available by that patient or by a staff member examining or taking care of the patient, preventing e.g. accidentally accessing another person's patient records. This way malpractice may be avoided.

A visibility object may define visibility definitions (enabling or rejecting visibility) for objects or contents referring to it directly or indirectly by its metadata. By metadata, object and/or content visibility may be defined on the basis of any visibility-affecting feature. Visibility-affecting feature may be, as already mentioned above, location of a mobile device, type of a network via which the EIM system is used by a mobile device, type of an application using the EIM system, or owner of a mobile device using the EIM system. However, it is also possible to use some other metadata values to define by which or where or how many object(s) the EIM system allows to be retrieved and displayed on a display view of a mobile device.

Metadata properties of objects may also be used for defining the maximum amount of visible objects. For example, the maximum number of displayed objects may be configured so that on a mobile device a certain number of objects are shown, for example, up to 100 objects, whereas on a non-mobile device a greater number of objects may be shown, for example, up to 1000 objects or unlimited. Additionally, metadata properties of objects may be used for defining the maximum number of visible objects for a certain time period. For example, on a specific mobile device and within a defined time period, for example, 24 hours or 1 hour, up to a determined number of objects may be retrieved to be displayed, for example, 100, 200 or any other determined number of objects. The number of objects is not restricted to shown numbers. The allowed number of objects may depend on, for example, the type of connection, speed, used network, application or device.

It should be noted that objects or metadata properties relating to objects are not limited to shown embodiments. On the contrary, it is possible that there are fewer or more objects or fewer or more metadata properties relating to object. In addition, object types or metadata properties are not restricted to shown embodiments; instead, an object in a dynamic information management system is a representation of any data, which may have a relationship with (i.e. refer to/be referred by) other objects. The dynamic data management system has a metadata structure that defines the semantics for the data. The metadata structure defines metadata for different objects as well as relationships between objects.

In summary, objects the visibility of which is not defined by a visibility component may be arranged not to be displayed by a mobile device and arranged to be displayed by a non-mobile device in any location if not restricted by some other way. Whereas, objects the visibility of which is defined by a visibility component may be arranged to be displayed by a mobile device if a visibility-affecting feature of the mobile device using an information management system is determined to correspond to the metadata value of a visibility component relating to the object. However, it is also possible that objects the visibility of which is not defined by a visibility component may be arranged to be displayed by any device if not restricted by some other way.

A server of an EIM system may be arranged to determine if visibility-affecting feature corresponds to a value of a visibility property of the visibility component.

FIG. 10 shows method for an enterprise information management system storing electronic data as electronic objects, wherein an electronic object is associated with metadata having one or more properties and corresponding values according to an example embodiment. In the method 1000, in step 1010 a visibility component from a metadata value of an object is determined. In step 1120 a visibility-affecting feature of a mobile device using the information management system is determined. In step 1030 the object to a display view of the mobile device is retrieved, if the determined visibility-affecting feature corresponds to a value of a visibility property of the visibility component.

The various embodiments of the invention can be implemented with the help of computer program code that resides in a memory and causes the relevant mobile devices to carry out the invention. For example, a mobile device may comprise circuitry and electronics for handling, receiving and transmitting data, computer program code in a memory, and a processor that, when running the computer program code, causes the mobile device to carry out the features of an embodiment. Yet further, a network device such as a server may comprise circuitry and electronics for handling, receiving and transmitting data, computer program code in a memory, and a processor that, when running the computer program code, causes the network device to carry out the features of an embodiment.

It is apparent that the present invention is not limited solely to the above-presented embodiments, but it can be modified within the scope of the appended claims.

The invention claimed is:

1. A method for an enterprise information management system storing electronic data as electronic objects, wherein an electronic object is associated with metadata having one or more properties and corresponding values, the method comprising:
   determining a visibility component from a metadata value of an object, wherein the visibility component is location of a device, type of a network via which the enterprise information management system is used, or type of an application by which the enterprise information management system is used;
   determining a visibility-affecting feature of a mobile device using the information management system, wherein the visibility-affecting feature is location of the mobile device, type of a network via which the enterprise information management system is used, or type of an application by which the enterprise information management system is used; and
   retrieving the object to a display view of the mobile device, if the determined visibility-affecting feature corresponds to a value of a visibility property of the visibility component.

2. The method according to claim 1, wherein the location is defined by coordinates of global positioning system.

3. The method according to claim 1, wherein the visibility-affecting feature is an owner of the mobile device.

4. The method according to claim 1, wherein the object comprises a document file.

5. The method according to claim 1, wherein the metadata of the object refers directly to the visibility component or indirectly via another object to the visibility component.

6. The method according to claim 1, wherein the visibility component is a visibility object arranged to define visibility of one or more objects.

7. An apparatus comprising at least one processor, memory including computer program code, the memory and the computer program code configured to, with the at least one processor, cause the apparatus to perform:
   determine a visibility component from a metadata value of an object, wherein the visibility component is location of a device, type of a network via which the enterprise information management system is used, or type of an application by which the enterprise information management system is used;
   determine a visibility-affecting feature of a mobile device using the information management system, wherein the visibility-affecting feature is location of the mobile device, type of a network via which the enterprise information management system is used, or type of an application by which the enterprise information management system is used; and
   retrieve the object to a display view of the mobile device, if the determined visibility-affecting feature corresponds to a value of a visibility property of the visibility component.

8. The apparatus according to claim 7, wherein the visibility-affecting feature is an owner of the mobile device.

9. The apparatus according to claim 7, wherein the metadata of the object refers directly to the visibility component.

10. The apparatus according to claim 7, wherein the metadata of the object refers indirectly via another object to the visibility component.

11. The apparatus according to claim 7, wherein the visibility component is a visibility object arranged to define visibility of one or more objects.

12. A computer program product embodied on a non-transitory computer readable medium, comprising computer program code configured to, when executed on at least one processor, cause an apparatus to:
   determine a visibility component from a metadata value of an object, wherein the visibility component is location of a device, type of a network via which the enterprise information management system is used, or type of an application by which the enterprise information management system is used;
   determine a visibility-affecting feature of a mobile device using the information management system, wherein the visibility-affecting feature is location of the mobile device, type of a network via which the enterprise information management system is used, or type of an application by which the enterprise information management system is used; and
   retrieve the object to a display view of the mobile device, if the determined visibility-affecting feature corresponds to a value of a visibility property of the visibility component.

13. The computer program product according to claim 12, wherein the location is defined by coordinates of global positioning system.

14. The computer program product according to claim 12, wherein the visibility-affecting feature is an owner of the mobile device.

15. The computer program product according to claim 12, wherein the metadata of the object refers directly or indirectly via another object to the visibility component.

16. The computer program product according to claim 12, wherein the visibility component is a visibility object arranged to define visibility of one or more objects.

17. An apparatus comprising:
   means for determining a visibility component from a metadata value of an object, wherein the visibility component is location of a device, type of a network via which the enterprise information management system is used, or type of an application by which the enterprise information management system is used;
   means for determining a visibility-affecting feature of a mobile device using the information management system, wherein the visibility-affecting feature is location of the mobile device, type of a network via which the enterprise information management system is used, or type of an application by which the enterprise information management system is used; and
   means for retrieving the object to a display view of the mobile device, if the determined visibility-affecting feature corresponds to a value of a visibility property of the visibility component.

* * * * *